July 9, 1957  W. A. HIGGINS  2,798,450
TIRE PRESSURE INDICATOR
Filed Feb. 2, 1956
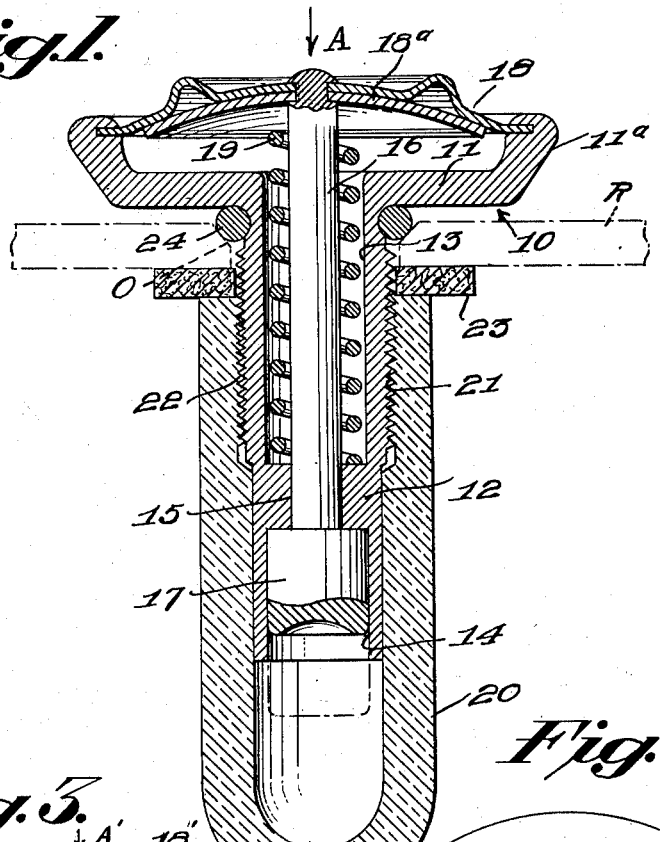
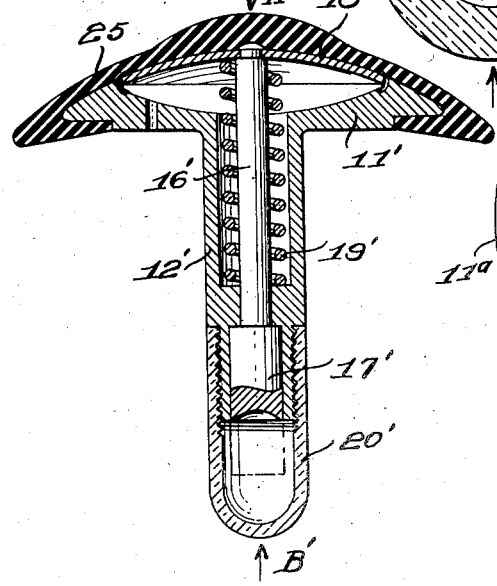
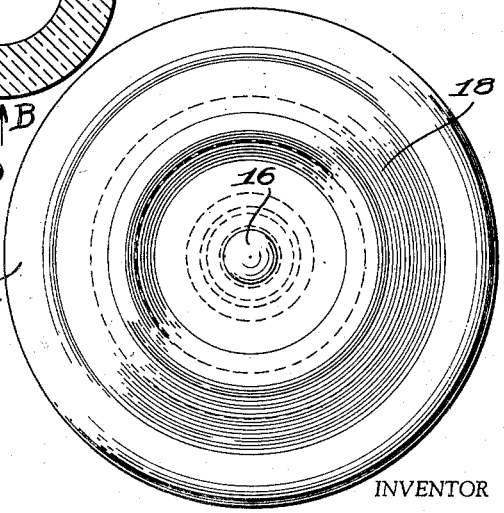
INVENTOR
William A. Higgins,
BY
ATTORNEY

United States Patent Office 2,798,450
Patented July 9, 1957

2,798,450

TIRE PRESSURE INDICATOR

William A. Higgins, Oakville, Ontario, Canada

Application February 2, 1956, Serial No. 563,049

3 Claims. (Cl. 116—34)

This invention relates to a tire pressure indicator.

The invention is more particularly concerned with a device for operative association with a motor vehicle wheel rim with an effective portion thereof disposed within a tire and beneath an inner tube therein and wherein the device includes visible means within the circumference of said rim for indication of effective or ineffective air pressure in the inner tube.

A principal object of the invention is the provision of a device of the above noted general character which is highly simple in construction, dependable in use, and efficient in operation.

Other objects and advantages of the invention will become apparent in the course of the following detailed description, taken in connection with the accompanying drawings, wherein—

Fig. 1 is a vertical axial sectional view of the improved device according to one structural embodiment thereof.

Fig. 2 is a top plan view of the device shown in Fig. 1.

Fig. 3 is a vertical axial sectional view of the device in accordance with a second structural embodiment thereof.

Referring now in detail to the drawing, and first to Figs. 1 and 2 thereof, the device comprises a body member 10 which includes an upwardly opening cup member 11 which is disposable within a tire casing and a depending cylindrical member 12 which as indicated in Fig. 1 extends through an opening O in a tire supporting rim R which is indicated partially in dot-and-dash lines.

The member 12 is provided with a relatively long upwardly opening cylindrical bore 13 and a relatively short downwardly opening cylindrical bore 14 and the bores are interconnected by a bore 15 of substantially less diameter.

A stem 16 extends through bores 13 and 15 co-axially thereof with a relatively close fit with the wall of bore 15, and a plunger 17 is rigid with the lower end of stem 16 and is movable within the bore 14.

A "Belleville" spring 18 is disposed within the cup member 11 with its margin engaged with the upwardly directed flange 11a of the latter and the central portion of the spring is rigidly secured to the upper end of the stem 16.

A coil spring 19 is disposed within the bore 13 in encircling relation to the stem 16 with the opposite ends thereof reacting on said first spring and the bottom wall of the bore 13.

A transparent cylindrical cup 20 surrounds the body member 12 with a substantial length thereof disposed below the lower end of member 12 as is clearly indicated in Fig. 1.

The member 12 is externally threaded as at 21 and the cap 20 is internally threaded as at 22 whereby the body member 10 is releasably secured in position by turning up the cap against the inner wall of rim R or a gasket 23 between the cap and rim which draws the cup member 11 downwardly into firm contact with an O-ring 24 disposed between the base of the cup member and the rim.

As is indicated in Fig. 1, the plunger 17 is shorter than the depth of bore 14 and the inner end of the plunger normally engages the bottom wall of the bore 14.

In operation under the following assumed conditions, maximum tire pressure 40 lb.; minimum tire pressure 34 lb.; effective pressure at A 20 lb. max.; effective pressure at A 17 lbs. min.

The compression spring 19 exerts a force of 16 lb. on spring 18 which also exerts a force of 4 lb., both in the direction of B.

As the tire pressure builds up to 40 lb. that is 20 lb. actual. The spring 18 deflects and finally snaps inwardly thereby forcing the plunger 17 to its downward position indicated by dot-and-dash lines and wherein the portion of the plunger below member 12 is visible through the cap 20.

Compression spring 19 now exerts a force of say 20 lbs. in the direction of arrow B and spring 18 exerts a force of say 3 lb. in direction of arrow A, with a net force of 17 lb. in direction of arrow B.

Now when the tire pressure falls to 34 lbs. (17 lb. actual), compression spring 19 will cause spring 18 to snap back to its original position and plunger 17 will be withdrawn to its concealed position.

The embodiment of the invention according to Fig. 3 is similar to that of Figs. 1 and 2 and which embodies body members 11' and 12'; stem 16', plunger 17', "Belleville" spring 18', compression spring 19' and transparent cap 20'.

This embodiment differs from the first principally in the form of the upper portion of the body member 12' which is covered with a rubber cushion 25 whereby the device is adapted for conformity with different form rims and the inner tube is provided with a generally smooth seat.

Due to the form of the "Belleville" spring in the embodiment of Figs. 1 and 2, it is preferable to dispose a backing plate 18a immediately beneath such spring and supported at its center by the stem 16.

The purpose of the backing plate is to distribute the air pressure on the "Belleville" spring throughout its entire area whereby the spring will not be wholly deflected under the 40 lb. pressure above referred to.

It is to be understood that the invention is equally applicable to tubeless tire and the usual tire embodying an outer casing and an inner tube.

Having set forth my invention in accordance with certain specific structural embodiments thereof, what I claim and desire to secure by U. S. Letters Patent is:

1. A tire pressure indicating device for operative association with a rim having a radial opening therein; comprising a body member including an outwardly opening cup portion disposable outwardly of the rim, and a cylindrical portion extendable inwardly through said opening in the rim, said cylindrical portion having a cylindrical bore opening into said cup portion and having a bottom wall, said cylindrical portion having a second cylindrical bore substantially shorter than said first cylindrical bore and concentric therewith opening through the inner end thereof and having a bottom wall, said cylindrical portion having a third cylindrical bore intermediate said first and second cylindrical bores concentric thereof and communicating therewith, a "Belleville" spring having its margin bridging the mouth of said cup portion and being engageable with the inner wall of an inner tube, a cylindrical stem depending from said spring and being slidably disposed in said cylindrical portion and having bearing in said third cylindrical bore, a coil compression spring disposed within said first cylindrical bore in surrounding relation to said stem and having its opposite ends reacting on said first spring and the bottom wall of said first bore, a cylindrical plunger on the lower end of said stem normally concealed within said second bore, and a transparent cap removably engaged with said cylindrical portion, the resistance to compression of said second spring being such that the first spring will snap inwardly under a predetermined maximum pressure in said tube and simultaneously therewith the plunger will protrude below the open end of said second bore, and upon said first spring being subjected to a predetermined minimum pressure in said tube, said second spring will cause same to snap back into its normal position with said plunger concealed within said second bore.

2. The structure according to claim 1 wherein said cap has a screw thread connection with said cylindrical portion, an O-ring disposed between said cup portion and said rim, and the upper end of said cap reacting on said rim for drawing said O-ring into firm sealing contact with said rim.

3. The structure according to claim 1, wherein said cup portion is provided with an inner tube engageable rubber cushion.

References Cited in the file of this patent
UNITED STATES PATENTS

| | | |
|---|---|---|
| 1,806,372 | Stille | May 19, 1931 |
| 2,579,120 | Mercer | Dec. 18, 1951 |